(12) United States Patent
Palacios Doñaque et al.

(10) Patent No.: US 7,618,538 B2
(45) Date of Patent: Nov. 17, 2009

(54) PROCEDURE FOR ELIMINATION OF BORON FROM SEA-WATER BY REVERSE OSMOSIS MEMBRANES

(75) Inventors: Enric Palacios Doñaque, Barcelona (ES); Manuel Fariñas Iglesias, Vizcaya (ES); Enric Palacios Jimenez, Barcelona (ES)

(73) Assignee: Acciona Agua, S.A.U., Alcobendas (Madrid) (ES)

( * ) Notice: Subject to any disclaimer, the term of this patent is extended or adjusted under 35 U.S.C. 154(b) by 102 days.

(21) Appl. No.: 11/653,264

(22) Filed: Jan. 16, 2007

(65) Prior Publication Data
US 2008/0035565 A1 Feb. 14, 2008

(30) Foreign Application Priority Data
Aug. 10, 2006 (ES) ................. 200602183

(51) Int. Cl.
*B01D 61/00* (2006.01)
*B01D 21/01* (2006.01)
*B03D 3/00* (2006.01)

(52) U.S. Cl. ............... 210/652; 210/651; 210/723; 210/724; 210/725; 210/750; 210/757; 210/705

(58) Field of Classification Search ......... 210/651–652, 210/750, 757, 705, 723–725, 639
See application file for complete search history.

(56) References Cited

U.S. PATENT DOCUMENTS

| | | | | |
|---|---|---|---|---|
| 5,186,257 A | * | 2/1993 | Stahl et al. ............... | 166/270.1 |
| 5,250,185 A | * | 10/1993 | Tao et al. .................. | 210/654 |
| 6,187,200 B1 | * | 2/2001 | Yamamura et al. ......... | 210/652 |
| 6,468,430 B1 | * | 10/2002 | Kimura et al. ............ | 210/636 |
| 7,097,769 B2 | * | 8/2006 | Liberman et al. .......... | 210/652 |
| 7,264,737 B2 | * | 9/2007 | Godec et al. .............. | 210/739 |
| 7,320,756 B2 | * | 1/2008 | Mukhopadhyay .......... | 210/652 |
| 7,368,058 B2 | * | 5/2008 | Nishikawa et al. ......... | 210/652 |
| 7,442,309 B2 | * | 10/2008 | Wilf et al. ................. | 210/652 |

FOREIGN PATENT DOCUMENTS

| | | | |
|---|---|---|---|
| JP | H10-225682 | * | 8/1988 |
| JP | H 11-138165 | * | 5/1999 |
| WO | WO 03/106348 A1 | * | 12/2003 |

OTHER PUBLICATIONS

Magara et al, Development of boron reduction system for sea water desalination; desalination 118 (1998) 25-34.*
Glueckstern et al, The impact of R& D on new technologies, novel design concepts and advanced operations procedres on cost of water desalination; desalination 139 (2000) 217-228.*
Prats et al, analysis of theinfluence of pH and pressure on the elimination of boron in reverse osmois; desalination 128 (2000, 269-273.*
Pastor et al., Influence of pH in the elimination of boron by means of reverse osmosis, Desalination 140 (2000) 145-152.*

* cited by examiner

*Primary Examiner*—Ana M Fortuna
(74) *Attorney, Agent, or Firm*—Wenderoth, Lind & Ponack, L.L.P

(57) ABSTRACT

The present invention relates to a procedure for elimination of boron from sea-water by reverse osmosis membranes characterized in that it comprises:
  adding to sea-water a composition consisting of at least one metal together with at least one antiscaling-dispersant agent, and
  a second phase in which an alkalinizing agent is added until a pH of between 8-9.5 is achieved, which can furthermore consist of a third phase in which the fluoride content of the sea-water is increased following the second phase, or a third phase in which a high molecular weight alcohol is added to the water.

13 Claims, 4 Drawing Sheets

PROCEDURE FOR ELIMINATION OF BORON FROM SEA-WATER BY REVERSE OSMOSIS MEMBRANES

FIELD OF THE INVENTION

The present invention falls within the area of procedures for elimination of boron from sea-water by reverse osmosis membranes.

PRIOR ART

The elimination of boron from sea-water is one of the prime objectives in desalinating plants producing water for human consumption.

Existing legislation currently establishes a limit on boron content of 1 mg/l in drinking water and water for agricultural irrigation. Nevertheless, this limit on boron concentration is going to be lowered to 0.5 mg/l. The processes used so far for the elimination of boron are fundamentally based on reverse osmosis membranes. This process is carried out in two steps:

The permeated water obtained in the first step of sea-water treatment by means of high rejection polyamide membranes is treated, either fully or partially, by a second step consisting of two stages with brackish water membranes (see FIG. 1).

This process has several drawbacks. First of all, there is a high investment cost, since a reverse osmosis plant needs to be installed next to the sea-water desalinating plant in order to treat the brackish water. Secondly, the pH of the permeated water obtained in the first step needs to be increased by means of caustic soda up to a value of 9.5-10. This entails considerable spending on this reagent, since the pH of the water obtained in the first step is between 5-6.5.

Moreover, as the work conversion in the second step is 90%, there is a high risk of precipitation of salts such as calcium carbonate, magnesium hydroxide and magnesium carbonate, as the most important compounds. In order to prevent this, it is furthermore necessary to add large quantities of antiscaling agents. The entire foregoing means considerable costs in investment and operation of the entire plant for desalination and elimination of boron. Also, the boron content in the final water obtained is very slightly below 0.5 mg/l.

The process that is used in the form recommended by the manufacturers of membranes is the elimination of boron in two steps, as shown in diagram 1 mentioned above.

Another process used is that of treating the sea-water with a first step of reverse osmosis membranes and the filtered or permeated water is then treated by ion exchange resins, with methyl-glucamine functional groups.

Mention can be made of "Optimization of boron removal in old and new SWRO systems (Pinhas Glueckstern, Menahem Priel (Desalination 156 (2003) 219-228); "Enhancement of boron removal in treatment of spent rinse from plating operation using RO" (Jian-Jun Qin, Maug Htun Oo, Hamhung Nyunt Wai, Yyi-Ming Cao) Desalination 172b (2005) 151-156.

Document US-2004/00065617 describes a method of elimination of boron consisting of alkalinising sea-water to a pH of about 8 to about 9.5 before passing it through the reverse osmosis membrane. As an option, it considers the possibility of adding a commercial antiscaling agent. Nevertheless, it does not disclose the use of a metal in the composition, and the content of boron that is achieved is approximately 2 ppm.

OBJECT OF THE PRESENT APPLICATION

The object of the present patent application is to overcome the said drawbacks, and this is achieved with a procedure for the elimination of boron by means of reverse osmosis membranes using just one desalination treatment step which can comprise one or more stages, working from 45 to 60% conversion, with one or two stages, with or without intermediate booster pump.

Sea-water, which has a boron content of between 3 and 5 mg/l, is currently pretreated in a first step by means of a system of disinfection, pH adjustment, coagulation-flocculation, filtration with sand in single or double stage, prelayer filters, cartridge filters; or it is pretreated by means of a disinfection and later filtration by means of hollow fibre, with later dosed addition of sodium bisulphite and, in some cases, the addition of an antiscaling agent.

In spite of these prior steps to which sea-water is subjected before being processed by reverse osmosis membranes, the boron content remains unaltered. This is due to the fact that the boron is almost entirely in the form of boric acid, which is a very hydrated compound and, moreover, is capable of passing through most polyamide reverse osmosis membranes, virtually in its entirety.

According to the present invention, the boric acid is prevented from passing through the polyamide membranes using a single step with one or two reverse osmosis stages, carrying out a considerable elimination of the boron and obtaining concentrations thereof that are below 0.5 mg/l in water permeated through the membranes.

DESCRIPTION OF THE INVENTION

The present invention relates to a procedure for elimination of boron from sea-water characterised in that it comprises:

a first phase in which added to sea-water is a composition consisting of at least one metal together with at least one antiscaling-dispersant agent, and a second phase in which an alkalinising agent is added until a pH of between 8-9.5 is achieved.

According to a second preferred embodiment of the procedure for elimination of boron, said procedure comprises:

a first phase in which added to sea-water is a composition consisting of at least one metal together with at least one antiscaling-dispersant agent, a second phase in which an alkalinising agent is added until a pH of between 8-9.5 is achieved, and a third phase in which the fluoride content of the sea-water is increased following the second phase.

According to a third preferred embodiment of the procedure for elimination of boron, said procedure comprises:

a first phase in which added to sea-water is a composition consisting of at least one metal together with at least one antiscaling-dispersant agent, a second phase in which an alkalinising agent is added until a pH of between 8-9.5 is achieved, and a third phase in which a high molecular weight alcohol is added to the water.

The antiscaling-dispersant agent can be any of those that are commercially available, for example, it can be selected from among a product containing phosphonates, a product containing organic phosphates, polymers derived from acrylic acid, phosphine carboxylic acid, polymaleic acid and mixtures thereof.

Some of the compounds based on phosphonates or organic phosphates which can be used are tripolyphosphoric acid, 1-hydroxyethylidene-1,1-diphosphonic acid, 2-phosphono-1,2,4-butanotricarboxylic acid, and phosphine polycarboxylic acid.

Among the polymers derived from acrylic acid can be mentioned polyacrylic acid and sulphonated polyacrylic acid. In addition to the cited compounds, the selected composition contains a proportion of between 2 and 10% by weight of at least one metal, such as Fe, Mn, Al, Ni, preferably Fe and Mn. The metal that is incorporated provides a better and greater effect of eliminating boron since it acts as a binder/bridge between the boron and the rest of the compounds cited above which form part of the composition. Said metal or metals are preferably in the form of salts, more preferably chlorides or sulphates and more preferably still as chlorides.

The alkalinising agent can be an alkaline or alkaline-earth metal hydroxide, such as NaOH, KOH or $Ca(OH)_2$.

Optionally, in the first phase a compound can also be added selected from among sodium bisulphite, sodium metabisulphite, sodium sulphite and mixtures thereof. This compound can be added in a solution in which this compound is alone or this compound has been previously mixed with the antiscaling agent and the two are added together. In this way, the anticrusting agent can be monitored by means of the redox potential.

Said antiscaling-dispersant agent can be added in a quantity of approximately 0.5 mg/l to approximately 7 mg/l of water, preferably from 1 to 5 mg/l of water.

When an alkalinising agent is added, such as caustic soda for example, part of the boric acid becomes converted into borate ion, which is much better rejected by the polyamide membranes. Thanks to the inventive procedure it is not necessary to raise the pH up to 9.5-10, since, on adding an antiscaling-dispersant agent, a reaction takes place between the products which this agent contains and the boric acid. This reaction occurs within the polyamide of the membrane by means of the —OH groups of the boric acid and the organic phosphate groups and/or carboxylic groups of the polymers of the antiscaling-dispersant agent. This is revealed by the fact that the filtered water obtained from the membranes has an alkaline pH higher than it would have had if the pH of the sea-water had not been increased to 8.5-9 and the antiscaling-dispersant agent studied for this case had not been added along with it. Normally the pH of permeated water is between 5.5-6.5 when it starts from a pH value of the feed-water to membranes of 7.5-8.

Another of the functions of the antiscaling-dispersant agent is to prevent the formation of precipitates, primarily, $CaCO_3$, $Fe(OH)_3$, $Al(OH)_3$ and oxides of manganese, since in no case is a pH of 10 exceeded in the reject water from the membranes, which would cause the precipitation of $Mg(OH)_2$ and $MgCO_3$. The boron content of the water obtained from filtering sea-water treated with this process in reverse osmosis membranes is between 0.1-0.3 mg/l. The fact of adding the sodium bisulphite, metabisulphite or sulphite, together with the special antiscaling-dispersant agent permits the presence of antiscaling-dispersant agent to be monitored by the redox potential (see FIG. 2b).

According to a second preferred embodiment of the procedure for elimination of boron, said procedure comprises:

a first phase in which added to sea-water is a composition consisting of at least one metal together with at least one antiscaling-dispersant agent, a second phase in which an alkalinising agent is added until a pH of between 8-9.5 is achieved, and a third phase in which the fluoride content of the sea-water is increased following the second phase.

According to this embodiment, the fluoride content of the sea-water after the second phase is increased by means of the addition of approximately 0.5 to approximately 4 ppm of fluoride anion, preferably from approximately 1 to approximately 3 ppm of fluoride. Said fluoride anion comes from a metal fluoride, preferably an alkaline or alkaline-earth metal fluoride, and more preferably still sodium fluoride.

As with the first embodiment already described, to the sea-water coming from the pretreatments is preferably added from 1 to 5 mg/l of an antiscaling-dispersant agent selected from among a product containing organic phosphonates or phosphates, polymers derived from acrylic acid, polymaleic acid and/or mixtures thereof. This agent can optionally be added mixed with sodium bisulphite, sodium sulphite or sodium metabisulphite. The fluoride content of the sea-water is then increased by adding from 1 to 3 ppm of sodium fluoride, and the sea-water is then alkalinised by means of an alkalinising agent, such as caustic soda, up to pH 8-9.5. Part of the boric agent is converted into fluoroborate ion, which is highly rejected by the polyamide membranes. This process of the passage of the borate ion to a compound formed from fluorine and boron takes place in the lattice of the polyamide polymer of the membranes.

The action of the antiscaling-dispersant agent is the same as that described in the first embodiment, though also avoiding the precipitation of the fluoride of a metal, for example, calcium fluoride, on the membranes. The fluoride ion remains as a species for being combined with the borate ion. Equally, these reactions produce an increase in the pH of the permeated water and a drop in pH of the reject brine from the membranes. The boron content of the water obtained by this process is between 0.1-0.3 mg/l (see FIGS. 3a and 3b).

According to a third preferred embodiment of the procedure for elimination of boron, said procedure comprises:

a first phase in which added to sea-water is a composition consisting of at least one metal together with at least one antiscaling-dispersant agent, a second phase in which an alkalinising agent is added until a pH of between 8-9.5 is achieved, and a third phase in which a high molecular weight alcohol is added to the water.

According to said third preferred embodiment, the alcohol is preferably selected from among manitol, sorbitol, propanotriol, polyvinylalcohol and combinations thereof. Other alcohols can cause problems, such as being trapped in the polyamide and dirtying the membranes.

In this embodiment, part of the boric acid is converted into borate ion, which is much better rejected by the membranes. Added to the water is approximately 0.5 to approximately 6 mg/l, preferably approximately 1 to approximately 5 mg/l, of a high molecular weight alcohol, such as manitol or sorbitol, whose alcohol groups are capable of reacting with some of the protons of the boric acid, forming a compound that is highly rejected by the reverse osmosis membranes in alkaline medium. This reaction takes place within the polymer of the polyamide because that is the site where there exist major concentrations of all the ions and different types of reactions and combinations are possible among pairs of ions.

The antiscaling-dispersant agent in this case, in addition to performing the function described above, also prevents the precipitation of calcium carbonate salts and metallic hydroxides on the polyamide of the membranes. The boron content in the water with this process is between 0.2-0.4 mg/l (see FIGS. 4a and 4b).

With this inventive procedure:
- the precipitation is prevented of salts such as calcium carbonate, metallic hydroxides and calcium fluoride during the processed of elimination of boron,
- a better effect is exerted in the elimination of boron by the reverse osmosis membranes,
- a greater rejection of boron in the membranes is achieved,
- it becomes possible to monitor the antiscaling-dispersant agent by the redox potential, when the antiscaling agent is mixed and added together with the sodium bisulphite, sodium metabisulphite or sodium sulphite.

The procedure for elimination of boron according to the present invention maintains its efficiency even if the polyamide membranes have reduced their rejection of salts. Likewise, the rejection of boron has not been affected by the decrease of salts in the membrane owing to the dirtying or partial blocking of the functional groups of the polyamide.

Moreover, the procedure permits the elimination of boron to be controlled by means of monitoring the antiscaling-dispersant agent via the measurement of the redox potential, thanks to the mixing and joint addition of the antiscaling agent with sodium bisulphite, sodium metabisulphite or sodium sulphite. This is a simple way of knowing whether the procedure is functioning in the desired manner since, as it is not possible to conduct a continual on-line analysis in real time, samples have to be taken at various moments of the procedure, and, as it is not possible to conduct a continual monitoring of the metal or of the antiscaling agent, this is the best way of ensuring and controlling the efficiency of the procedure.

EXAMPLE OF EMBODIMENT OF THE INVENTION

Figure 1:
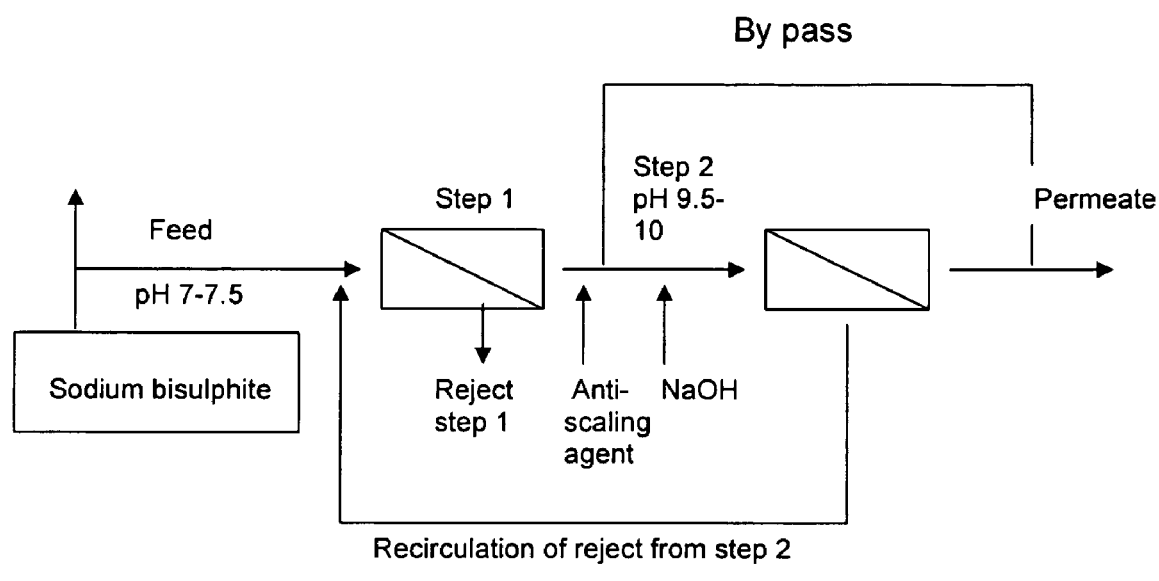
FIG. 1 shows a flow diagram of the conventional procedure for elimination of boron from sea-water.
Figure 2A:
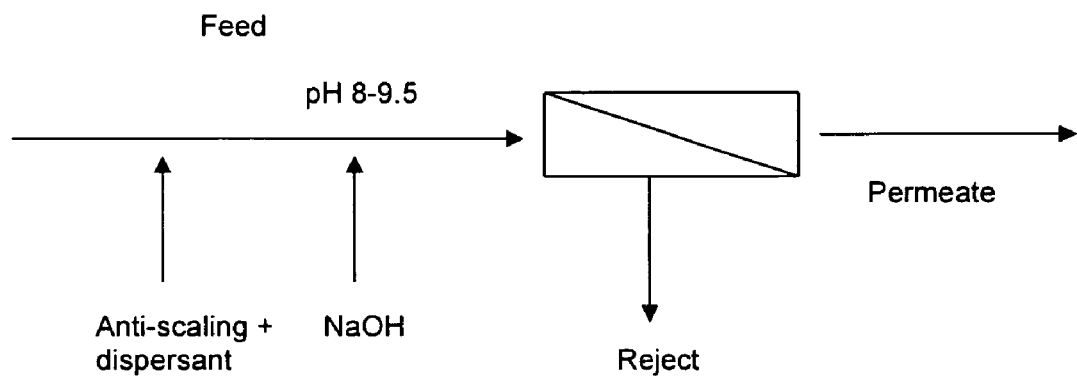
FIG. 2a shows a flow diagram of the procedure for elimination of boron according to a first preferred embodiment of the present invention.
Figure 2B:
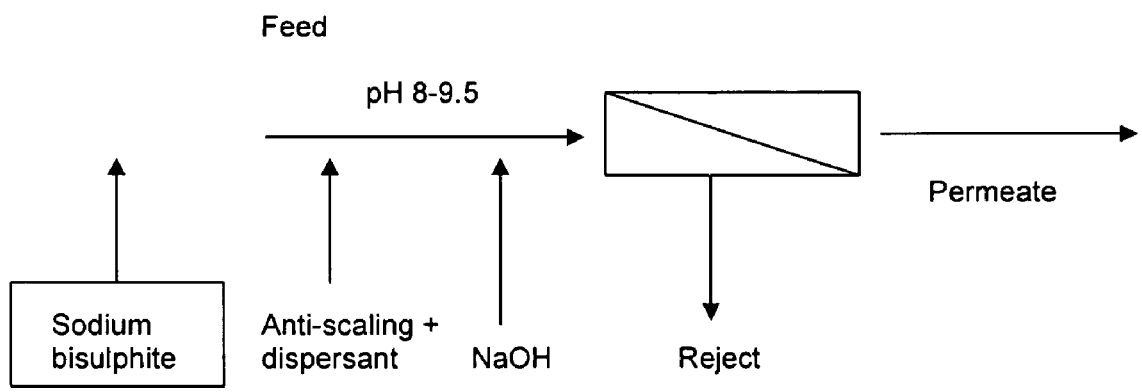
FIG. 2b shows a flow diagram of the procedure for elimination of boron adding sodium bisulphite according to a first preferred embodiment of the present invention.
Figure 3A:
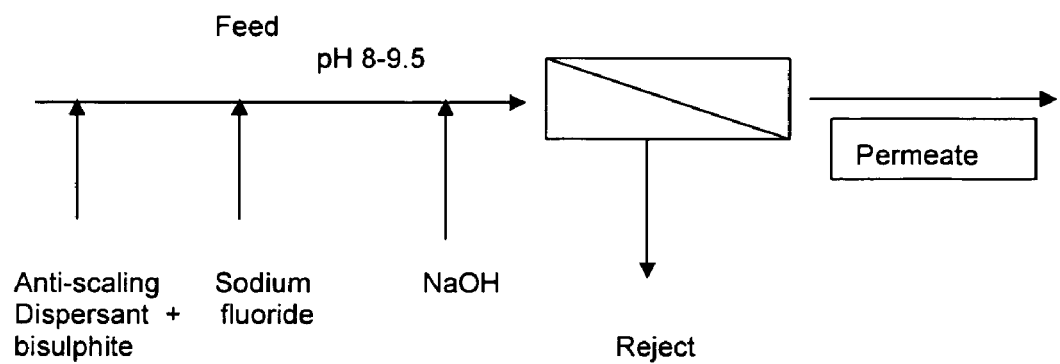
FIG. 3a shows a flow diagram of the procedure for elimination of boron according to a second preferred embodiment of the present invention.
Figure 3B:
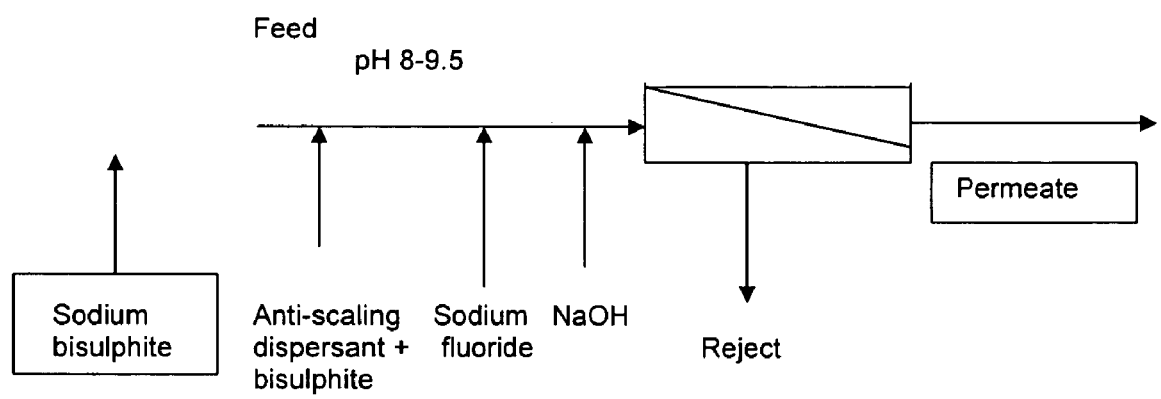
FIG. 3b shows a flow diagram of the procedure for elimination of boron adding sodium bisulphite according to a second preferred embodiment of the present invention
Figure 4A:
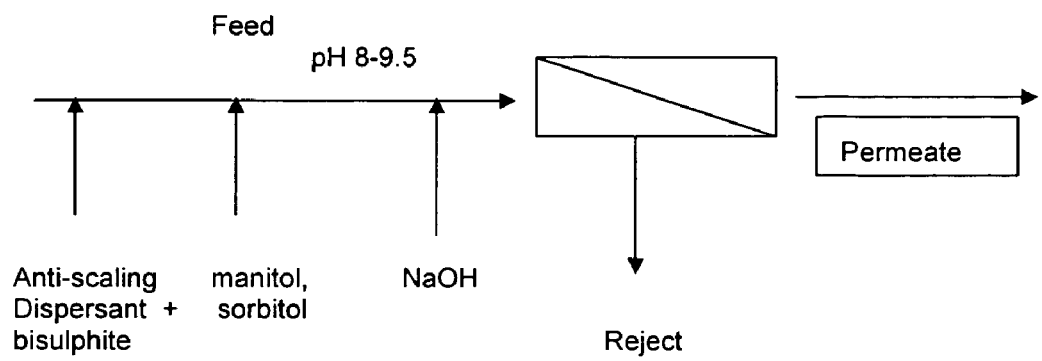
FIG. 4a shows a flow diagram of the procedure for elimination of boron according to a third preferred embodiment of the present invention.
Figure 4B:
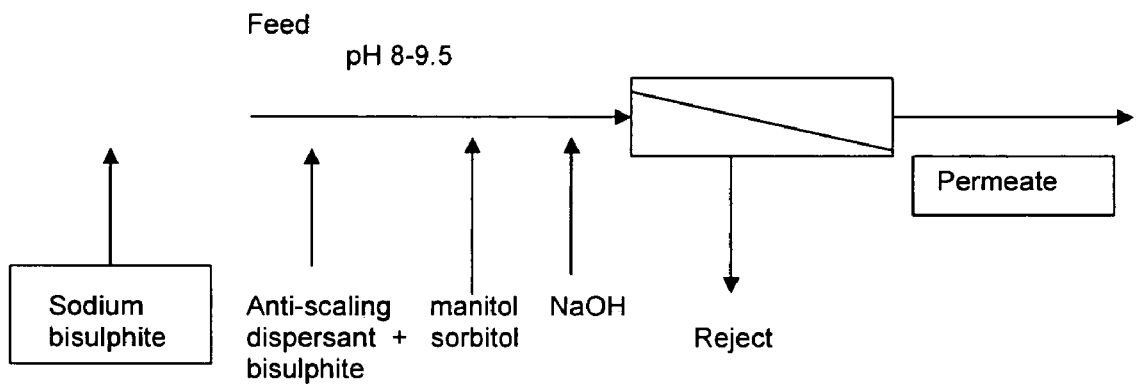
FIG. 4b shows a flow diagram of the procedure for elimination of boron adding sodium bisulphite according to a third preferred embodiment of the present invention.

A trial was conducted in a pilot plant equipped with two stages of reverse osmosis constituting a first step. In the field of the art, "stages" are understood as being each group of containers or pressure boxes where the membranes are housed and each array of one or more groups of pressure boxes or containers is known as a "step". Each stage is provided with one or more pressure boxes or containers where six, seven or eight membranes can be housed and working with conversions of between 45% and 60%. The reject water from the first stage was fed to the second stage with a flow of feed water to the first reverse osmosis box or container which varied between 7-13 m³/h. Between 1-5 mg/l of antiscaling-dispersant agent together with iron sulphate was then added to the sea-water to treat. Next, 14-25 mg/l of caustic soda was added and a pH of 8.5-8.7 was obtained. Finally, the boron content of the water filtered or permeated by the membranes was analysed, and it was observed that the concentration thereof lay between 0.1-0.3 mg/l of water, depending on the initial concentration of boron which the sea-water might have contained.

The invention claimed is:

1. A procedure for elimination of boron from sea-water by reverse osmosis membranes which comprises:
    a first phase in which a composition consisting of at least one metal together with at least one antiscaling-dispersant agent is added to sea-water,
    further adding a sulphite compound during the first phase,
    a second phase in which an alkalinising agent is added until a pH of between 8 and 9.5 is achieved,
    a reverse osmosis step which comprises subjecting the sea-water having said pH between 8 and 9.5 and the added components to reverse osmosis in order to obtain permeate water having a reduced boron content of 0.1 to 0.3 mg/L,
    wherein said sulphite compound is selected from the group consisting of sodium bisulphite, sodium metabisulphite and sodium sulphite or mixtures thereof,
    monitoring the presence of the at least one antiscaling-dispersant agent by measuring a redox potential of the sea-water to which the sulphite compound has been added,
    comparing the redox potential as measured with a reference value of a redox potential corresponding to a desired level of the antiscaling-dispersant agent, and
    adjusting the addition of the antiscaling-dispersant agent until the redox potential as measured corresponds to the reference value of the redox potential.

2. The procedure for elimination of boron according to claim 1, further comprising:
    a third phase in which a fluoride content of the sea-water is increased following the second phase.

3. The procedure for elimination of boron according to claim 2, wherein the increase of the fluoride content of the sea-water after the second phase is by means of an addition of from 1 to 3 ppm of fluoride anion.

4. The procedure for elimination of boron according to claim 3, wherein said fluoride anion is in the form of sodium fluoride.

5. The procedure for elimination of boron according to claim 1, further comprising:
    a third phase in which a high molecular weight alcohol is added to the sea-water.

6. The procedure for elimination of boron according to claim 5, wherein the alcohol is selected from the group consisting of mannitol, sorbitol, propanotriol, polyvinylalcohol and combinations thereof.

7. The procedure for elimination of boron according to claim 1, wherein said antiscaling-dispersant agent is selected from the group consisting of a product containing a phosphonate, a product containing an organic phosphate, a polymer derived from acrylic acid, phosphine carboxylic acid, polymaleic acid and mixtures thereof.

8. The procedure for elimination of boron according to claim 1, wherein said sodium bisulphite, sodium metabisulphite or sodium sulphite is added in a single solution.

9. The procedure for elimination of boron according to claim 1, wherein the at least one antiscaling-dispersant agent is present in a quantity of 0.5 to 7 mg/l of water.

10. The procedure for elimination of boron according to claim 1, wherein the at least one antiscaling agent is present in a quantity of 1 to 5 mg/l of water.

11. The procedure for elimination of boron according to claim 1, wherein said metal is selected from the group consisting of Fe, Mn, Al, Ni and combinations thereof.

12. The procedure for elimination of boron according to claim 1, wherein said metal is in the form of a salt selected from the group consisting of chloride and sulphate.

13. The procedure for elimination of boron according to claim 1, wherein the at least one metal is present in a quantity between 2 and 10% by weight of the composition added in the first phase.

* * * * *